United States Patent
Parra et al.

(10) Patent No.: US 11,606,752 B1
(45) Date of Patent: Mar. 14, 2023

(54) COMBINING LONG EDRX PERIODS AND CUSTOM PSM CYCLES

(71) Applicants: AT&T Intellectual Property I, L.P., Atlanta, GA (US); AT&T Mobility II LLC, Atlanta, GA (US)

(72) Inventors: Darwin Parra, Cedar Park, TX (US); Robert Holden, Allen, TX (US); Jeff Bartlett, Dallas, TX (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 17/504,951

(22) Filed: Oct. 19, 2021

(51) Int. Cl.
*H04W 52/02* (2009.01)
*H04W 60/04* (2009.01)
*H04W 68/00* (2009.01)

(52) U.S. Cl.
CPC ....... *H04W 52/0232* (2013.01); *H04W 60/04* (2013.01); *H04W 68/005* (2013.01)

(58) Field of Classification Search
CPC . H04W 52/00; H04W 52/02; H04W 52/0209; H04W 52/0225; H04W 52/0232; H04W 60/04; H04W 68/00; H04W 68/005
See application file for complete search history.

(56) References Cited

U.S. PATENT DOCUMENTS

| | | | |
|---|---|---|---|
| 2017/0332330 A1* | 11/2017 | Dhandu | H04W 4/021 |
| 2018/0054796 A1* | 2/2018 | Edge | H04W 4/029 |
| 2018/0103427 A1* | 4/2018 | Griot | H04W 76/40 |
| 2018/0220294 A1* | 8/2018 | Ukil | H04W 52/0258 |
| 2018/0270188 A1* | 9/2018 | Kodaypak | H04L 51/58 |
| 2018/0317163 A1* | 11/2018 | Lee | H04W 48/18 |
| 2018/0352469 A1* | 12/2018 | Cakulev | H04W 76/28 |
| 2019/0159132 A1* | 5/2019 | Abraham | H04W 52/0274 |
| 2019/0349858 A1* | 11/2019 | Jantzi | H04W 76/28 |
| 2020/0107237 A1* | 4/2020 | Mangalvedhe | G08G 5/0013 |
| 2020/0112916 A1* | 4/2020 | Dusenberry | H04W 52/0274 |
| 2020/0275410 A1* | 8/2020 | Kodaypak | H04W 68/02 |
| 2021/0100040 A1* | 4/2021 | Bhardwaj | H04W 76/27 |
| 2021/0256833 A1* | 8/2021 | Daoura | H04W 52/0216 |

FOREIGN PATENT DOCUMENTS

| | | | | |
|---|---|---|---|---|
| WO | WO-2016182530 A1 | * | 11/2016 | H04W 52/0216 |
| WO | WO-2018111171 A1 | * | 6/2018 | H04W 4/38 |
| WO | WO-2020236047 A1 | * | 11/2020 | |

\* cited by examiner

*Primary Examiner* — Kevin D Mew
(74) *Attorney, Agent, or Firm* — Guntin & Gust, PLC; John G. Rauch

(57) ABSTRACT

A method, system, computer readable storage medium, or apparatus provides for or both the use of long extended discontinuous reception (eDRX) and long power saving mode (PSM) without having to wait for the activity timer expiration.

20 Claims, 4 Drawing Sheets

COMBINING LONG EDRX PERIODS AND CUSTOM PSM CYCLES

BACKGROUND

Extended discontinuous reception (eDRX) is an extension of the DRX feature that is used by user equipment to reduce power consumption. DRX is a mechanism in which a device goes into sleep mode for a certain period and then wakes up after a fixed interval to receive signals.

This background information is provided to reveal information believed by the applicant to be of possible relevance. No admission is necessarily intended, nor should be construed, that any of the preceding information constitutes prior art.

SUMMARY

The Power Saving Mode (PSM) mode of operation does not interact with enhanced Discontinuous Reception (eDRX) since the network will not configure eDRX unless the UE signals an active timer greater than 0. Conventionally, if a device operates with both PSM and eDRX where Active Timer=0 (the UE goes to Power Saving Mode immediately after inactivity timer) any configured eDRX parameters are discarded by the network as the UE is considered unreachable during IDLE state and blocks any paging occasion. The disclosed subject matter provides for methods, systems, and apparatus in which a UE can use eDRX and PSM with timer of 0.

In an example, a user equipment may include a processor and a memory coupled with the processor that effectuates operations. The operations may include receiving one or more values for modem configuration, wherein the values in response to attention commands; in response to the one or more values, setting power saving mode (PSM) to off, when PSM is off and extended discontinuous reception (eDRX) is on and set to a duration, performing an attachment procedure or a tracking area update; detecting that the duration of the eDRX has expired or reception of a duration of a paging time window; based on the detecting that the duration of the eDRX has expired or reception of the data end, setting the PSM to on, wherein the PSM has a PSM timer when the PSM is on; and at a time before the PSM timer expires, setting the PSM to off.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Power Saving Mode (PSM) is a mode that a user equipment (UE) tells the network it is going to go dormant indefinitely. When the UE decides, based on some logic or timer, that it is time to transmit, it wakes up and transmits to the network, and remains in RX mode for prescribed minimum number (e.g., 4) idle frames so that it can be reachable if needed.

The choice of having the PSM feature on or off depends on the application. In an exemplary use case, a utility meter company, may specifically want to have a significantly long time between registrations, but also want to have a long eDRX time to allow for the backend servers to reach the meter. Conventionally in 3GPP for this to happen, there is a mandatory minimum activity timer of 5.12 seconds. The disclosed subject matter allows for the activity timer, $T_{act}$, (which is a minimum activity timer) to be circumvented using attention (AT) commands or similar commands without necessarily altering the 3GPP standard. In summary, the disclosed subject matter allows for both the use of long eDRX and long PSM without having to wait for the $T_{act}$ (also referred herein as T3324) durations.

Figure 1:
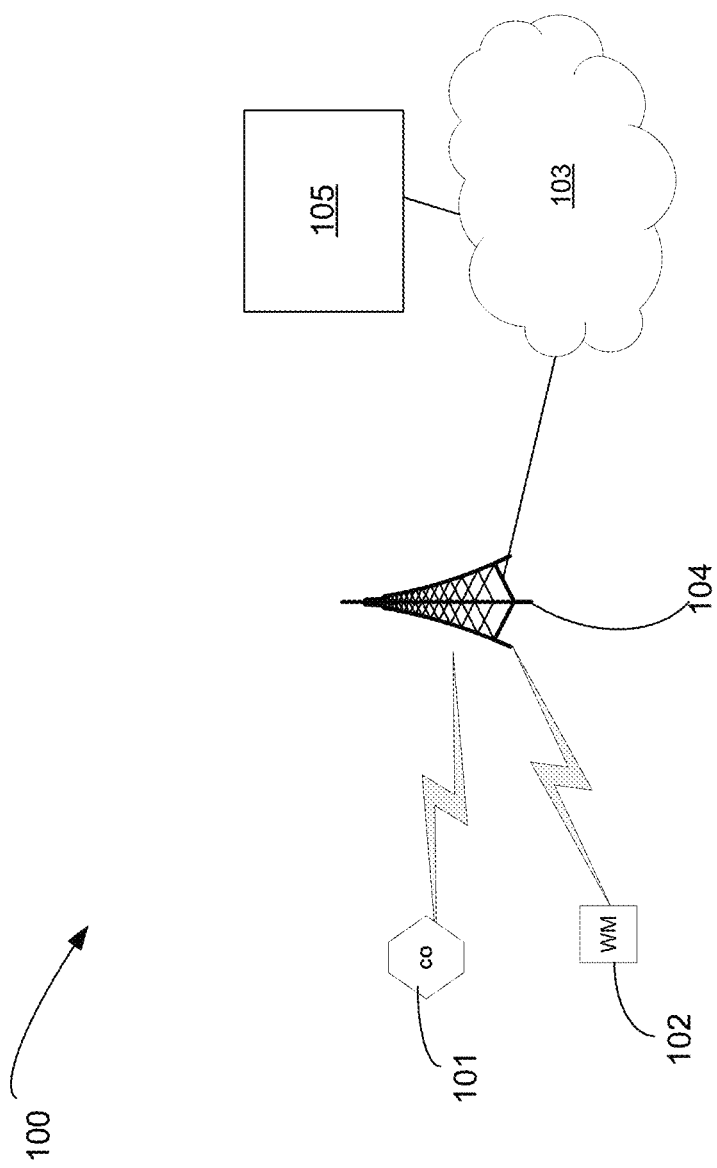
FIG. 1 illustrates an exemplary system to dynamically adjust PSM cycles for eDRX periods.

FIG. 1 illustrates an exemplary system to dynamically adjust PSM cycles and eDRX. System 100 may include device 101 (e.g., an air quality sensor), device 102 (e.g., a utility meter), base station 104, or device 105 (e.g., a server). The devices of system 100 may be communicatively connected with each other and network 103 (e.g., a cloud network). In an exemplary use case, device 101 or device 102 may include a sensor, a meter, laptop, tablet, autonomous vehicle (e.g., SAE Intl level 3 to level 5 automation), internet of things (IoT) device, or mobile phone, among other things. Base station 104 may be a wireless wide area network base station, which may operate with a 3GPP wireless communication standard. Device 105 may include wireless or wired devices, such as servers, routers, switches, desktop computers, or the like. The method steps herein may be executed by one or more devices, such as device 101, device 102, device 104, or device 105.

Figure 2:
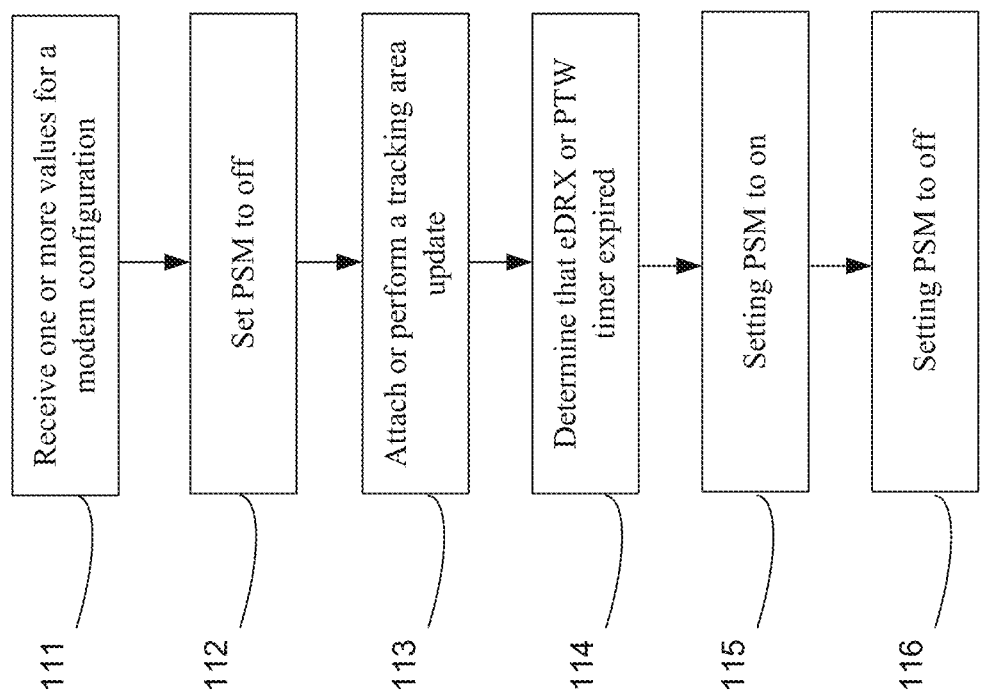
FIG. 2 illustrates an exemplary method for dynamically adjust PSM cycles for eDRX periods.

FIG. 2 illustrates an exemplary method for dynamically adjusting PSM cycles. At step 111, one or more values for a modem configuration may be received. The values may be in response to attention (AT) commands. At step 112, in response to step 111, an application level of device 101 (e.g., an IoT device) sets PSM to off. These parameters for PSM may be initially configured in device 101 to execute upon power up. At step 113, device 101 may attach or perform a tracking area update (which may be a periodic tracking area update) with PSM off while eDRX is on. In an example use case, upon initial power-up, device 101 may attach with PSM off and eDRX parameters set to the desired value of $T_{eDRX}$ (e.g., eDRX timer) and $T_{ptw}$ (e.g., timer for paging time window).

With continued reference to FIG. 2, at step 114, determining that $T_{eDRX}$ or $T_{ptw}$ is expired or data RX has ended. Data RX may be ended by using a feature, such as RAI that can trigger device 101 to disconnect from the network. This step may be monitored by the upper layers of the application. At step 115, in response to step 114, setting PSM to on, which may be instructed by an application layer of device 101. When the PSM is set to on, the timer T3324 is set to zero. T3324 indicates how long device 101 has to wait before going into PSM mode. Note that conventionally it is not allowed for T3324 to be set to zero if eDRX is being used (on or the other must be used conventionally).

The time in between tracking area updates can be set to a value (e.g., a value between four hours and 310 hours), depending on the application. And the change of the PSM status to on triggers a tracking area update from device 101, towards the network (e.g., base station 104 and network 103), signaling that PSM is now on. And then the network is configured to ignore any parameters, it doesn't matter the parameters declared from the device, the PSM parameters will take precedence. The technical effect for this allows for device 101 to have an abnormally long tracking area update interval, which is a goal of power saving mode.

At step 116, at a predetermined time before the PSM timer (T3412) expires, setting the PSM to off (e.g., step 112 again) The application layer (e.g., RIL control application) may keep track of T3412 and the predetermined time may be static or dynamic and set by the application. The predetermined time may be any time before the expiration of T3412 and the AT command (or equivalent) may be used to set such predetermined time or deactivate PSM (e.g., turn PSM off). Effectively, returning PSM to off may trigger another tracking area update (TAU) or the like with PSM off while the eDRX parameters are on, the parameters are valid for that particular instance of attach or tracking area and device 101 may proceed to use eDRX. Step 111-step 116 may be continuously be repeated.

For additional perspective, conventionally there is a challenge in using eDRX and PSM together. When device 101 is in a PSM status of on, device 101 is not reachable from the network (e.g., base station 104), for all practical purposes it is off, and base station 104 cannot send pages or anything to device 101 or device 101 cannot receive and react to pages. The purpose for such functionality is to save battery life on device 101 (e.g., a UE). Conventionally the way the PSM feature is implemented, prior to device 101 getting into such power saving mode (and relatively unreachable) state, device 101 may be required to wait a time period (T3324). Device 101 cannot go directly into PSM without T3324 set to a certain value. Conventionally T3324 may be set to zero, but then eDRX cannot be used. So, as disclosed herein, there is a way to manipulate the d PSM and eDRX features, by turning PSM on and off in order for device 101 to both use eDRX for long periods of time and enter into PSM quickly.

Figure 3:
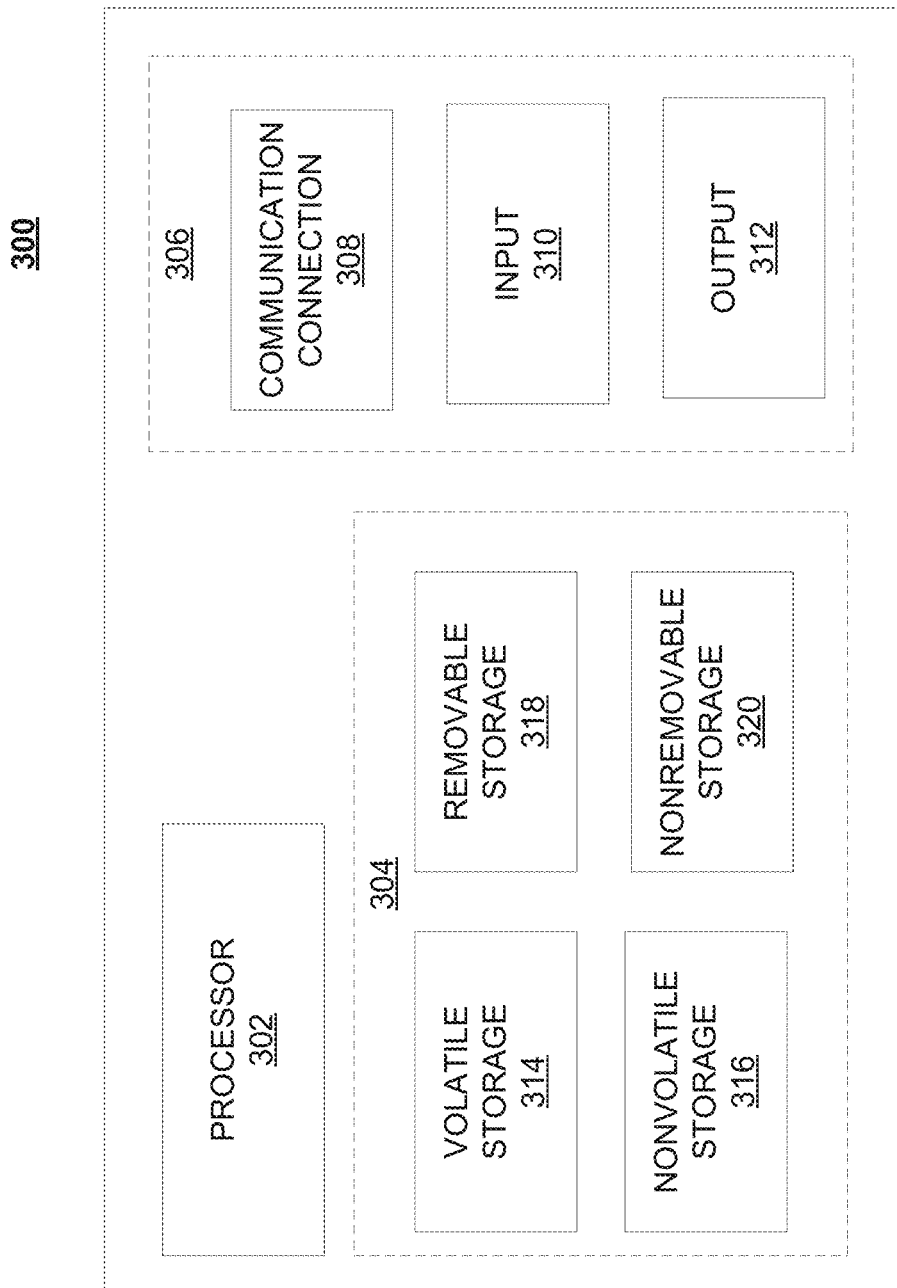
FIG. 3 illustrates a schematic of an exemplary network device.

FIG. 3 is a block diagram of network device 300 that may be connected to or comprise a component of system 100 of FIG. 1. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
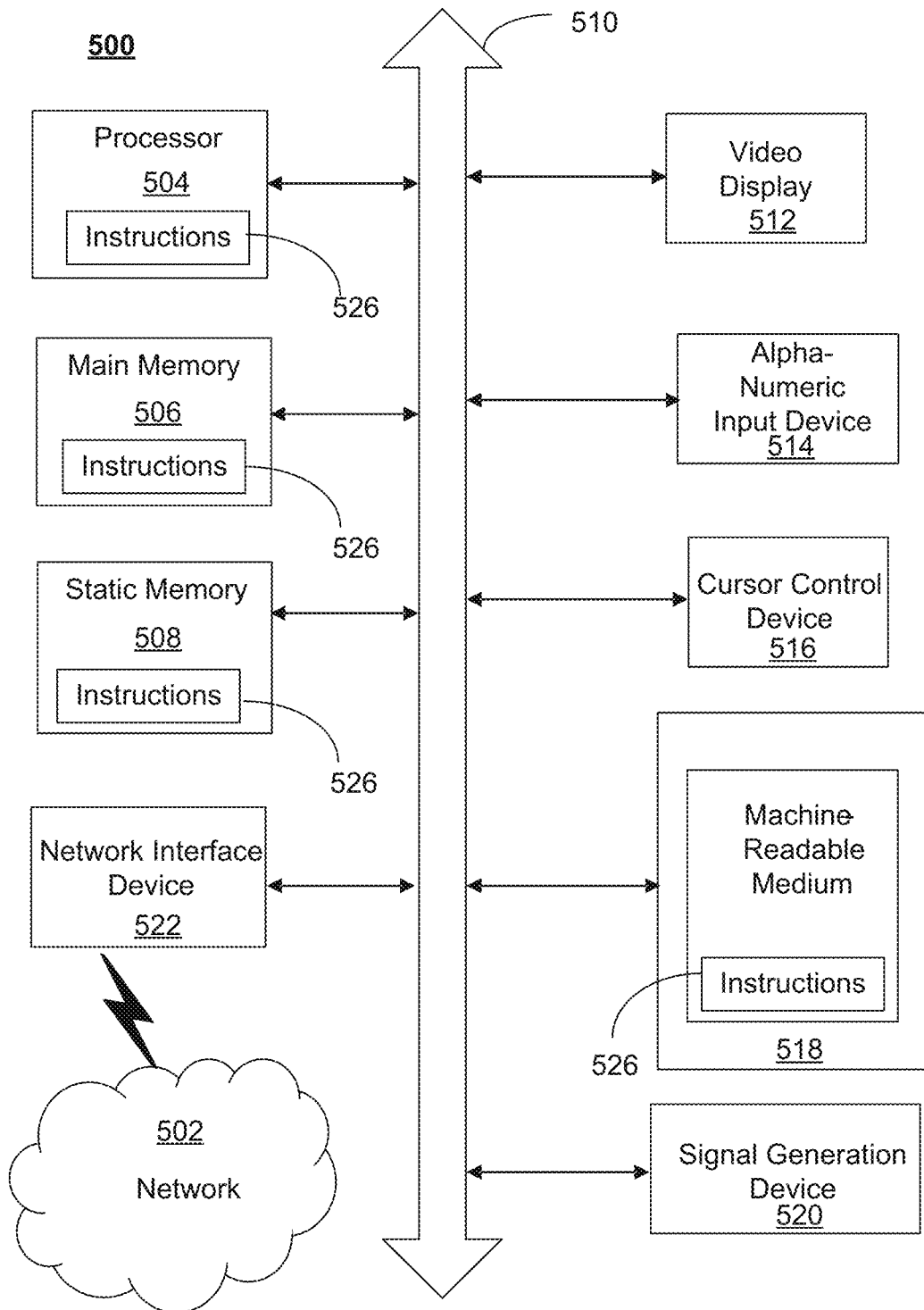
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the methods described above. One or more instances of the machine can operate, for example, as processor 302, device 101, device 102, base station 104, device 105 and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which dynamic PSM and eDRX alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—dynamically adjust PSM cycles for eDRX periods—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide managing or operating PSM cycles or eDRX periods. A method, system, computer readable storage medium, or apparatus provides for receiving one or more values for a device configuration, wherein the values in response to attention commands; in response to the one or more values, setting power saving mode (PSM) to off, when PSM is off and extended discontinuous reception (eDRX) is on and set to a duration, performing an attachment procedure or a tracking area update; detecting that the duration of the eDRX has expired or reception of a duration of a paging time window; based on the detecting that the duration of the eDRX has expired or reception of the data end, setting the PSM to on, wherein the PSM has a PSM timer when the PSM is on; and at a time before the PSM timer expires, setting the PSM to off. Attention (AT) commands may be used to set $T_{eDRX}$ (e.g., eDRX timer) to a time an application requires (e.g., between 5.12 seconds to 43.7 minutes as provided in the 3GPP standard). Also, the $T_{PTW}$ (e.g., timer for paging time window) may be set to a duration, such as 128 seconds to 428 seconds as provided in the 3GPP standard. Although the AT command is referenced any equivalent such command is contemplated herein. All combinations in this paragraph (including the removal or addition of steps) are contemplated in a manner that is consistent with the other portions of the detailed description.

What is claimed:

1. A method for power saving mode cycles of 3rd Generation Partnership Project (3GPP), the method comprising:
   receiving one or more values for configuration of a modem of a device;
   in response to the one or more values, setting power saving mode (PSM) to off,
   when PSM is off and extended discontinuous reception (eDRX) is on and set to a duration, performing an attachment procedure or a tracking area update;
   detecting that the duration of the eDRX has expired or reception of a duration of a paging time window;
   based on the detecting that the duration of the eDRX has expired or reception of data end, setting the PSM to on, wherein the PSM has a PSM timer when the PSM is on; and
   at a time before the PSM timer expires, setting the PSM to off.

2. The method of claim 1, wherein the one or more values are based on attention commands.

3. The method of claim 1, wherein the one or more values are based on attention commands that are activated upon powering on the modem.

4. The method of claim 1, wherein the PSM is set to off or on by an upper layer application.

5. The method of claim 1, further comprising when the PSM is set to on, sending a tracking area update to a network.

6. The method of claim 1, further comprising when the PSM is set to on, sending a tracking area update to a network, wherein the tracking area update signals that the PSM is on.

7. The method of claim 1, wherein the device is an internet of things device.

8. The method of claim 1, wherein the device is a sensor or meter.

9. The method of claim 1, wherein the time before the PSM timer expires is set between 1 second and 10 seconds.

10. An apparatus comprising:
    a processor; and
    memory coupled with the processor, the memory storing executable instructions that when executed by the processor cause the processor to effectuate operations comprising:
    receiving one or more values for configuration of a modem of a device;
    in response to the one or more values, setting power saving mode (PSM) to off,
    when PSM is off and extended discontinuous reception (eDRX) is on and set to a duration, performing an attachment procedure or a tracking area update;
    detecting that the duration of the eDRX has expired or reception of a duration of a paging time window;
    based on the detecting that the duration of the eDRX has expired or reception of data end, setting the PSM to on, wherein the PSM has a PSM timer when the PSM is on; and
    at a time before the PSM timer expires, setting the PSM to off.

11. The apparatus of claim 10, wherein the one or more values are based on attention commands.

12. The apparatus of claim 10, wherein the one or more values are based on attention commands that are activated upon powering on the modem.

13. The apparatus of claim 10, wherein the PSM is set to off or on by an upper layer application.

14. The apparatus of claim 10, the operations further comprising when the PSM is set to on, sending a tracking area update to a network.

15. The apparatus of claim 10, the operations further comprising when the PSM is set to on, sending a tracking area update to a network, wherein the tracking area update signals that the PSM is on.

16. The apparatus of claim 10, wherein the device is an internet of things device.

17. The apparatus of claim 10, wherein the device is a sensor or meter.

18. The apparatus of claim 10, wherein the time before the PSM timer expires is set between 1 second and 10 seconds.

19. A computer readable storage medium storing computer executable instructions that when executed by a computing device cause said computing device to effectuate operations comprising:

receiving one or more values for configuration of a modem of a device;

in response to the one or more values, setting power saving mode (PSM) to off, when PSM is off and extended discontinuous reception (eDRX) is on and set to a duration, performing an attachment procedure or a tracking area update;

detecting that the duration of the eDRX has expired or reception of a duration of a paging time window;

based on the detecting that the duration of the eDRX has expired or reception of data end, setting the PSM to on, wherein the PSM has a PSM timer when the PSM is on; and at a time before the PSM timer expires, setting the PSM to off.

20. The computer readable storage medium of claim 19, wherein the one or more values are based on attention commands that are activated upon powering on the modem.

\* \* \* \* \*